UNITED STATES PATENT OFFICE.

FRIEDRICH WILHELM WEBER, OF PERTH AMBOY, NEW JERSEY, ASSIGNOR TO THE ROESSLER & HASSLACHER CHEMICAL CO., OF NEW YORK, N. Y., A CORPORATION OF NEW YORK.

STABLE PRODUCT CONTAINING HYDROGEN PEROXID AND METHOD OF MAKING THE SAME.

1,210,570.  Specification of Letters Patent.  Patented Jan. 2, 1917.

No Drawing.  Application filed May 8, 1915. Serial No. 26,710.

*To all whom it may concern:*

Be it known that I, FRIEDRICH WILHELM WEBER, a subject of the Emperor of Germany, residing at Perth Amboy, county of Middlesex, and State of New Jersey, have invented certain new and useful Improvements in Stable Products Containing Hydrogen Peroxid and Methods of Making the Same, of which the following is a specification.

This invention relates to stable products containing hydrogen peroxid.

It is well known that diluted solutions of peroxid of hydrogen, especially aqueous solutions made by diluting a concentrated hydrogen peroxid, decompose in a rather short time and that the addition of small amounts of an acid renders the same stable for a very long time. It is furthermore well known that the stabilizing effect of a small amount of acid or of a substance giving an acid reaction added to solutions of hydrogen also extends to compounds containing hydrogen peroxid as a constitutional part of their substance. It has also been recognized that this stabilizing effect is not exerted by any representative of the great group of acids; that, on the contrary, only a limited number of the same seem to have a selective tendency for combining with hydrogen peroxid and even many of this latter group of well known acids, though apparently giving satisfaction in the initial stage of the experiments, have been found unsuited to perform the desired function of conveying to hydrogen peroxid and its compounds, a stability which justly can claim the merit of permanency. A further shortcoming of many of these latter acids, when added to hydrogen peroxid compounds, is their strongly acid reaction, resulting in complications for instance, when applied for medicinal purposes. It has therefore been desirable to find an acid having a selective tendency for stabilizing compounds containing hydrogen peroxid, while permitting a universal application of such stabilized hydrogen peroxid or of the compounds containing the same.

I have discovered that by the addition of a small quantity of hippuric acid to solutions as well as to solid compounds of hydrogen peroxid, said solutions or solid compounds respectively, are given a most desirable stability and open the field for a much greater and more universal application of said solutions as well as of solid compounds containing hydrogen peroxid than has hitherto been possible.

As illustrations of means for carrying out my process I cite the following examples:

Example 1: I dissolve 1 gram of hippuric acid in one liter of a 10% aqueous hydrogen peroxid solution thus rendering the solution stable, the solution showing practically no loss after twelve weeks, while a plain hydrogen peroxid solution without the hippuric acid easily undergoes decomposition.

Example 2: In preparing a stable compound consisting of a combination of urea and hydrogen-peroxid I proceed about as follows: 100 grams of urea are dissolved in distilled water of a medium temperature and 1 gram of hippuric acid is then dissolved in said solution; the same is then filtered while still warm and evaporated to dryness. The residue obtained is then powdered and treated with the theoretical quantity of a 30% hydrogen peroxid solution and cooled to a temperature of 0° C., whereby a product containing about 36% $H_2O_2$ is obtained, which may be easily separated by filtration and gives off the moisture very rapidly. The product itself is very uniform and consists of very fine crystals of snow-white color, which, kept continuously at a temperature of 75-80° F. for twelve weeks and longer, showed practically no loss of active oxygen. The remarkable stability which the double compound or urea and hydrogen peroxid thus obtains by my process must be attributed to the great stabilizing power displayed by the hippuric acid penetrating the whole mass of the crystals of the double compound, so that these minute quantities of the hippuric acid are actually embodied in the substance of the double compound itself.

It is immaterial for my new process, as operated along the lines of Example 1, of what origin the hydrogen peroxid to be stabilized will be. If, for instance, the hydrogen peroxid is generated by dissolving in water, any persalt or peroxid, and if free alkali is generated in such a case, said free alkali should first be neutralized by any suitable acid, whereupon the hydrogen peroxid solution thus obtained may be stabilized by addition of hippuric acid.

I claim:

1. The method of stabilizing a solid product containing hydrogen peroxid, consisting in dissolving hippuric acid in a solution of urea, evaporating the solution to dryness, adding the residue to hydrogen peroxid and separating the crystals of the double compound of urea and hydrogen peroxid from the liquor.

2. As a new composition of matter, a product containing hydrogen peroxid and hippuric acid.

3. As a new composition of matter a solid product consisting of urea, hydrogen peroxid and hippuric acid.

In testimony whereof I have signed this specification in the presence of two subscribing witnesses.

FRIEDRICH WILHELM WEBER.

Witnesses:
GEORGE GILLIS,
OTTO K. ZUNNYENBEYER.